United States Patent
Lenz et al.

(10) Patent No.: US 11,111,797 B2
(45) Date of Patent: *Sep. 7, 2021

(54) MOLYBDENUM-SILICON-BORON WITH NOBLE METAL BARRIER LAYER

(71) Applicant: RAYTHEON TECHNOLOGIES CORPORATION, Farmington, CT (US)

(72) Inventors: Brendan M. Lenz, West Hartford, CT (US); Douglas M. Berczik, Manchester, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 41 days.

This patent is subject to a terminal disclaimer.

(21) Appl. No.: 16/432,417

(22) Filed: Jun. 5, 2019

(65) Prior Publication Data

US 2019/0309637 A1 Oct. 10, 2019

Related U.S. Application Data

(63) Continuation of application No. 15/149,344, filed on May 9, 2016, now Pat. No. 10,329,926.

(51) Int. Cl.
*F01D 5/28* (2006.01)
*C25D 7/00* (2006.01)
(Continued)

(52) U.S. Cl.
CPC .................. *F01D 5/28* (2013.01); *C25D 3/46* (2013.01); *C25D 3/48* (2013.01); *C25D 3/50* (2013.01); *C25D 3/54* (2013.01); *C25D 5/10* (2013.01); *C25D 5/50* (2013.01); *C25D 7/008* (2013.01); *F01D 5/288* (2013.01); *F02C 3/04* (2013.01); *F05D 2220/32* (2013.01);
(Continued)

(58) Field of Classification Search
CPC .. F01D 5/28; F01D 5/288; C25D 5/10; C25D 5/50; C25D 3/46; C25D 3/54; C25D 3/50; C25D 3/48; C25D 7/008; F02C 3/04; F05D 2300/131; F05D 2220/32; F05D 2300/15; F05D 2300/14
USPC ......................................................... 60/805
See application file for complete search history.

(56) References Cited

U.S. PATENT DOCUMENTS 2,805,192 A * 9/1957 Brenner .................. C25D 5/38
205/176
2,942,970 A * 6/1960 Goetzel ............... C22C 32/0047
419/12
(Continued)

FOREIGN PATENT DOCUMENTS

DE 102005025076 A1 * 12/2006 ............. C23C 10/08

OTHER PUBLICATIONS

Ziarani, A.S. and Aguilera, R. (2011). Knudsen's permeability correction for tight porous media. Transp Porous Med (2012). vol. 91. pp. 239-260.

(Continued)

*Primary Examiner* — J. Todd Newton
(74) *Attorney, Agent, or Firm* — Carlson, Gaskey & Olds, P.C.

(57) ABSTRACT

An article includes a substrate formed of a molybdenum-based alloy. A barrier layer is disposed on the substrate. The barrier layer is formed of at least one noble metal.

18 Claims, 2 Drawing Sheets

(51) Int. Cl.
*C25D 3/46* (2006.01)
*C25D 3/48* (2006.01)
*C25D 3/50* (2006.01)
*C25D 3/54* (2006.01)
*F02C 3/04* (2006.01)
*C25D 5/10* (2006.01)
*C25D 5/50* (2006.01)

(52) U.S. Cl.
CPC .... *F05D 2300/131* (2013.01); *F05D 2300/14* (2013.01); *F05D 2300/15* (2013.01); *Y02T 50/60* (2013.01)

(56) References Cited

U.S. PATENT DOCUMENTS

| | | | | |
|---|---|---|---|---|
| 2,982,619 | A * | 5/1961 | Long | C04B 35/58085 75/245 |
| 3,039,292 | A * | 6/1962 | Ottestad | F41A 33/00 73/12.01 |
| 3,309,292 | A * | 3/1967 | Andrews | C25D 5/10 205/103 |
| 5,595,616 | A * | 1/1997 | Berczik | C22C 32/0047 148/538 |
| 5,693,156 | A | 12/1997 | Berczik | |
| 5,740,515 | A * | 4/1998 | Beele | C23C 4/02 428/552 |
| 5,851,678 | A * | 12/1998 | Hasz | C23C 28/00 428/469 |
| 5,865,909 | A * | 2/1999 | Meyer | C22C 27/04 148/423 |
| 5,914,189 | A * | 6/1999 | Hasz | C23C 28/042 428/335 |
| 6,261,643 | B1 * | 7/2001 | Hasz | C23C 28/048 427/419.1 |
| 6,332,926 | B1 * | 12/2001 | Pfaendtner | C23C 16/042 118/721 |
| 6,340,398 | B1 * | 1/2002 | Parthasarathy | C23C 10/02 148/279 |
| 6,497,968 | B2 * | 12/2002 | Zhao | C23C 30/005 428/663 |
| 6,652,674 | B1 * | 11/2003 | Woodard | C22C 1/045 148/423 |
| 6,746,782 | B2 * | 6/2004 | Zhao | C22C 27/00 204/192.15 |
| 6,767,653 | B2 * | 7/2004 | Bewlay | C23C 30/00 428/660 |
| 7,005,191 | B2 | 2/2006 | Perepezko et al. | |
| 7,063,894 | B2 * | 6/2006 | Sun | C04B 41/009 416/241 B |
| 7,560,138 | B2 | 7/2009 | Perepezko et al. | |
| 7,622,150 | B2 | 11/2009 | Zhao et al. | |
| 7,951,459 | B2 * | 5/2011 | Tang | C23C 30/00 428/450 |
| 10,329,926 | B2 * | 6/2019 | Lenz | C25D 3/48 |
| 2002/0119340 | A1 * | 8/2002 | Zhao | C04B 41/87 428/610 |
| 2004/0126237 | A1 * | 7/2004 | Jackson | C23C 28/34 416/97 R |
| 2004/0219295 | A1 * | 11/2004 | Perepezko | F01D 5/288 427/255.27 |
| 2007/0205510 | A1 * | 9/2007 | Lavoie | C23C 28/322 257/734 |
| 2009/0324989 | A1 * | 12/2009 | Witz | F01D 5/28 428/613 |
| 2010/0266772 | A1 * | 10/2010 | Hu | C23C 10/02 427/328 |
| 2014/0272344 | A1 * | 9/2014 | Wan | C04B 41/009 428/213 |

OTHER PUBLICATIONS

Cerri, G., Giovannelli, A., Battisti, L., and Fedrizzi, R. (2007). Advances in effusive cooling techniques of gas turbines. Applied Thermal Engineering. vol. 27. pp. 692-698.
Gokaltun, S., Skudarnov, P.V., Sukop, M.C. and Gulikravich, G.S. (2007). Statistical modeling of rarefield gas flows in microchannels. 18th AIAA Computational Fluid Dynamics Conference. Jun. 25-28, 2007.
Herman, P. K., Lehmann, M. J., Velu, Y. K. (2006). Predicting initial pressure drop of fibrous filter media-Typical models and recent improvements. Journal of Textile and Apparel, Technology Management. vol. 5(2). 2006. pp. 2-15.
Pulkrabek, W. W. and Ibele, W. E. (1987). The effect of temperature on the permeability of a porous material. Int. J. Heat Mass Transfer. vol. 30(6). pp. 1103-1109.
Woodruff, L. W. and Lorenz, G. C. (1966). Hypersonic turbulent transpiration cooling including downstream effects. AIAA Journal. vol. 4(6). pp. 969-975.
Schneibel, J. H., Kruzic, J. J., and Ritchie, R. O. (2003). Mo—S—B alloy development. 17th Annual Conference on Fossil Energy Materials. Jan. 2003.
Extended European Search Report for European Application No. 17169712.1 completed Sep. 27, 2017.

* cited by examiner

MOLYBDENUM-SILICON-BORON WITH NOBLE METAL BARRIER LAYER

CROSS-REFERENCED TO RELATED APPLICATION

This application is a continuation of U.S. application Ser. No. 15/149,344, which was filed on May 9, 2016.

BACKGROUND

Gas turbine engines and other machines often operate under severely elevated temperature conditions. Components that are exposed to the elevated temperatures can be formed of temperature-resistant metal alloys, such as nickel alloys or molybdenum alloys. Molybdenum alloys generally have good strength and other properties at high temperatures but are potentially susceptible to oxidation in high temperature oxidizing environments. The inclusion of silicon and boron in the alloy can reduce oxygen infiltration into the alloy through formation of a passive borosilicate scale.

SUMMARY

An article according to an example of the present disclosure includes a substrate formed of a molybdenum-based alloy. The molybdenum-based alloy has a composition that has molybdenum, silicon, and boron. A barrier layer is disposed on the substrate. The barrier layer is formed of at least one noble metal.

A further embodiment of any of the foregoing embodiments includes a metal interlayer disposed between the substrate and the barrier layer.

In a further embodiment of any of the foregoing embodiments, the metal interlayer is formed of a different metal than the barrier layer and is selected from the group consisting of copper, gold, platinum, and combinations thereof.

In a further embodiment of any of the foregoing embodiments, the metal interlayer includes copper.

In a further embodiment of any of the foregoing embodiments, the at least one noble metal is selected from the group consisting of ruthenium, rhodium, palladium, silver, osmium, iridium, platinum, gold, and combinations thereof.

In a further embodiment of any of the foregoing embodiments, at least one noble metal includes platinum.

A further embodiment of any of the foregoing embodiments includes a topcoat disposed on the barrier layer.

In a further embodiment of any of the foregoing embodiments, the topcoat is formed of a silica material.

In a further embodiment of any of the foregoing embodiments, the substrate defines an internal cavity, and the barrier layer is disposed on the substrate in the internal cavity.

A method of fabricating an article according to an example of the present disclosure includes depositing a barrier layer onto a substrate formed of a molybdenum-based alloy. The molybdenum-based alloy has a composition that includes molybdenum, silicon, and boron. The barrier layer has at least one noble metal.

A further embodiment of any of the foregoing embodiments includes, prior to depositing the barrier layer, depositing a metal interlayer onto the substrate.

In a further embodiment of any of the foregoing embodiments, the metal interlayer is formed of a different metal than the barrier layer and is selected from the group consisting of copper, gold, platinum, and combinations thereof.

A further embodiment of any of the foregoing embodiments includes thermally treating the substrate with the metal interlayer and the barrier layer, and conducting the thermal treating at a temperature above the melting point of the metal of the metal interlayer but below the melting point of the at least one noble metal.

A further embodiment of any of the foregoing embodiments includes depositing the metal interlayer and depositing the barrier layer using electroplating.

In a further embodiment of any of the foregoing embodiments, the substrate defines an internal cavity, and the barrier layer is deposited on the substrate in the internal cavity.

A gas turbine engine according to an example of the present disclosure includes an engine section selected from the group consisting of a compressor section, a combustor section, and a turbine section. The engine section has a turbine engine component including a substrate formed of a molybdenum-based alloy. The molybdenum-based alloy has a composition that includes molybdenum, silicon, and boron. A barrier layer is disposed on the substrate. The barrier layer is formed of at least one noble metal.

A further embodiment of any of the foregoing embodiments includes a metal interlayer disposed between the substrate and the barrier layer.

In a further embodiment of any of the foregoing embodiments, metal interlayer is formed of a different metal than the barrier layer and is selected from the group consisting of copper, gold, platinum, and combinations thereof.

In a further embodiment of any of the foregoing embodiments, at least one noble metal is selected from the group consisting of ruthenium, rhodium, palladium, silver, osmium, iridium, platinum, gold, and combinations thereof.

In a further embodiment of any of the foregoing embodiments, substrate defines an internal cavity, and the metal interlayer and the barrier layer are disposed on the substrate in the internal cavity.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
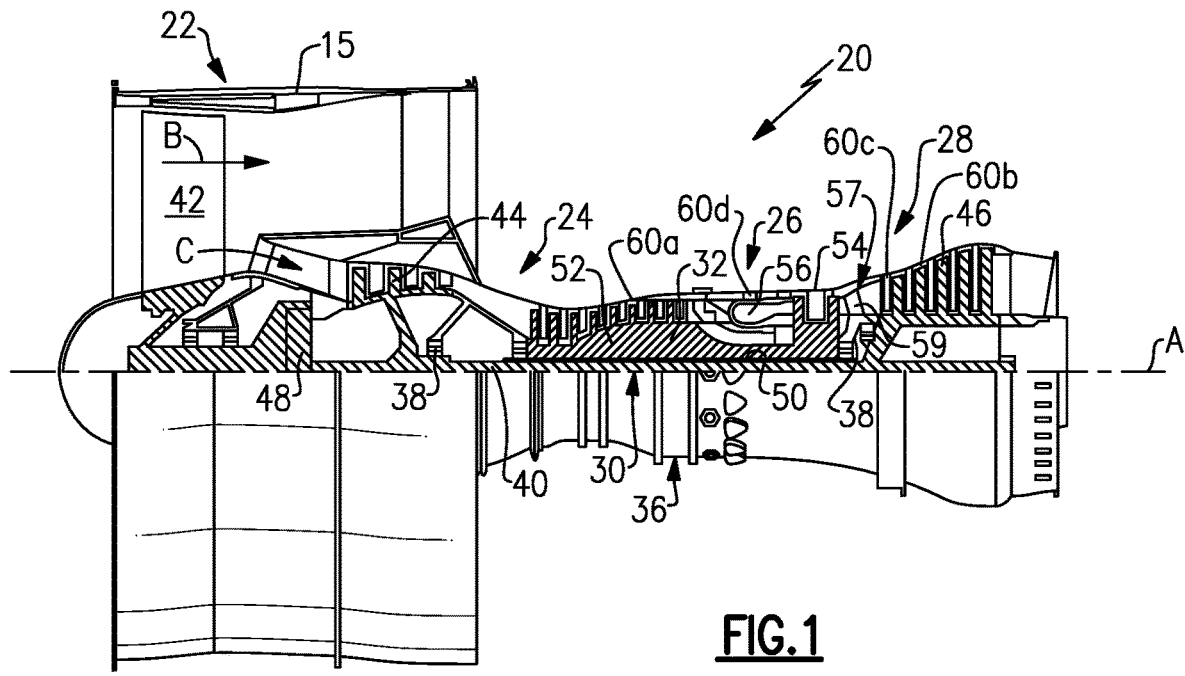
FIG. 1 illustrates an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engine designs can include an augmentor section (not shown) among other systems or features.

The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, the examples herein are not limited to use with two-spool turbofans and may be applied to other types of turbomachinery, including direct drive engine architectures, three-spool engine architectures, and ground-based turbines.

The engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48, to drive the fan 42 at a lower speed than the low speed spool 30.

The high speed spool 32 includes an outer shaft 50 that interconnects a second (or high) pressure compressor 52 and a second (or high) pressure turbine 54. A combustor 56 is arranged between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports the bearing systems 38 in the turbine section 28. The inner shaft 40 and the outer shaft 50 are concentric and rotate via bearing systems 38 about the engine central longitudinal axis A, which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines, including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram° R)/(518.7° R)]^{0.5}$. The "Low corrected fan tip speed" as disclosed herein according to one non-limiting embodiment is less than about 1150 ft/second.

Figure 2:
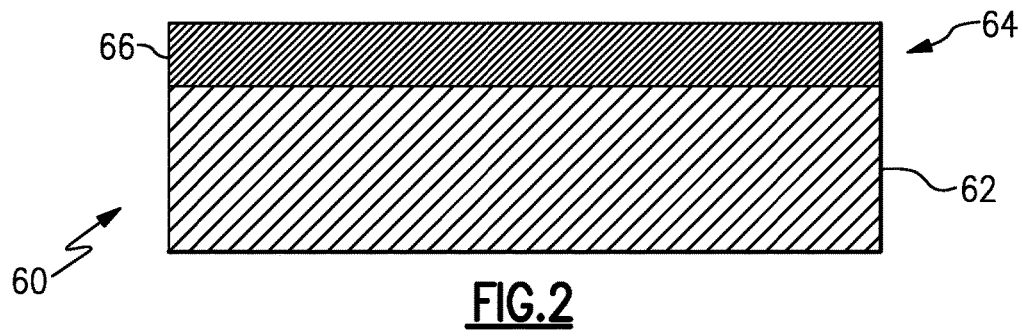
FIG. 2 illustrates a cross-section of a portion of an article that has a Mo—Si—B alloy substrate and a noble metal barrier layer.

FIG. 2 illustrates a representative portion of an example article 60. For instance, the article 60 is, or is a portion of, a gas turbine engine article in the gas turbine engine 20. For example, the article 60 may be in the compressor section 24, the combustor section 26, and/or the turbine section 28. In this regard, the article 60 may be, but is not limited to, a blade outer air seal (represented at 60a and 60b in FIG. 1), an airfoil (e.g., a vane, represented at 60c in FIG. 1), a housing or casing (represented at 60d in FIG. 1), a structural component, or the like that is exposed to relatively hot temperatures in the engine 20 (e.g., in the core gas path C).

The article 60 includes a substrate 62 that is formed of a molybdenum-based alloy. For example, the substrate 62 is the structural body of the article 60 that provides the shape of the article 60. The molybdenum-based alloy has a composition that includes molybdenum, silicon, and boron. For example, the composition of the molybdenum-based alloy is predominantly molybdenum, and the silicon, boron, and any other alloy elements are present in substantially lesser amounts than the molybdenum. Alloying elements are generally present in amounts no less than 0.2% by weight.

While the silicon and the boron in the alloy can reduce oxygen infiltration into the alloy through formation of a passive borosilicate scale, in some oxidizing environments the oxygen can permeate the scale or infiltrate the alloy prior to scale formation and volatilize the molybdenum. The volatilization of molybdenum potentially results in alloy weight loss known as "recession," which potentially leads to loss of mechanical properties of the alloy. In this regard, the article 60 includes a coating 64 that serves as an oxygen barrier to enhance resistance to oxygen infiltration, oxidation, and volatilization of molybdenum.

In the illustrated example, the coating 64 includes a barrier layer 66 that is disposed on the substrate 62. For instance, the barrier layer 66 is immediately adjacent to, and contiguous with, the substrate 62. Alternatively, additional layers could be provided between the substrate 62 and the barrier layer 66 and/or on top of the barrier layer 66.

The barrier layer 66 is formed of at least one noble metal that resists oxidation and limits oxygen infiltration into the substrate 64. As an example, the barrier layer 66 has a thickness in the range of approximately 1 micrometer to approximately 50 micrometers. Thicknesses toward the lower end of the range may have lower barrier properties but higher spall-resistance to thermal stress; while thicknesses toward the higher end of the range may have higher barrier properties but lower spall-resistance to thermal stresses.

The noble metal or metals of the barrier layer 66 are in metallic form. The term "metallic form" refers to a metallically bonded metal, rather than a metal that is ionically or covalently bonded to non-metal atoms in compounds. For example, the noble metal or metals are selected from ruthenium, rhodium, palladium, silver, osmium, iridium, platinum, gold, and combinations thereof. In a further example, the barrier layer 66 is formed essentially or only of a single type of noble metal, and the noble metal is platinum.

Figure 3:
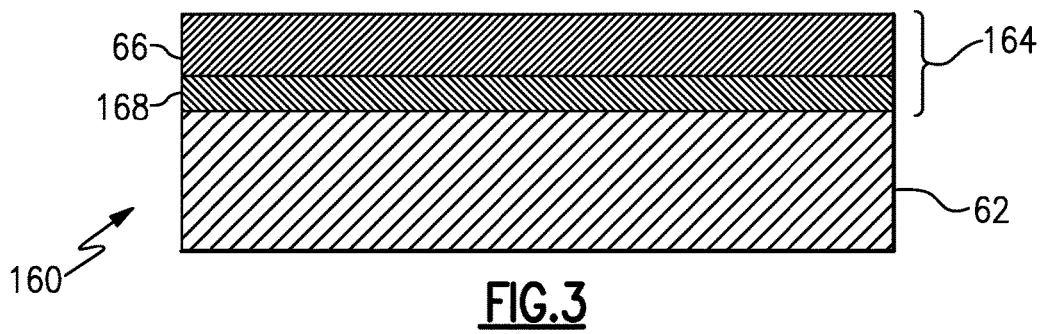
FIG. 3 illustrates a cross-section of a portion of an article that has a Mo—Si—B alloy substrate, a noble metal barrier layer, and a metal interlayer.

FIG. 3 illustrates another example article 160. In this disclosure, like reference numerals designate like elements where appropriate and reference numerals with the addition of one-hundred or multiples thereof designate modified elements that are understood to incorporate the same features and benefits of the corresponding elements. In this example, the article 160 has a coating 164 which, in addition to the barrier layer 66, includes a metal interlayer 168 that is disposed between the substrate 62 and the barrier layer 66. The metal interlayer 168 is formed of a different metal than the barrier layer 66 and is selected from copper, gold, platinum, and combinations thereof. In a further example, the metal interlayer 168 is formed essentially or only of a single type of metal, and the metal is copper.

The metal interlayer 168 may serve to facilitate bonding of the barrier layer 66 to the substrate 62. Additionally or alternatively, the metal interlayer 168 may serve as fluxing agent to promote the formation of the borosilicate scale in the molybdenum-based alloy.

Figure 4:
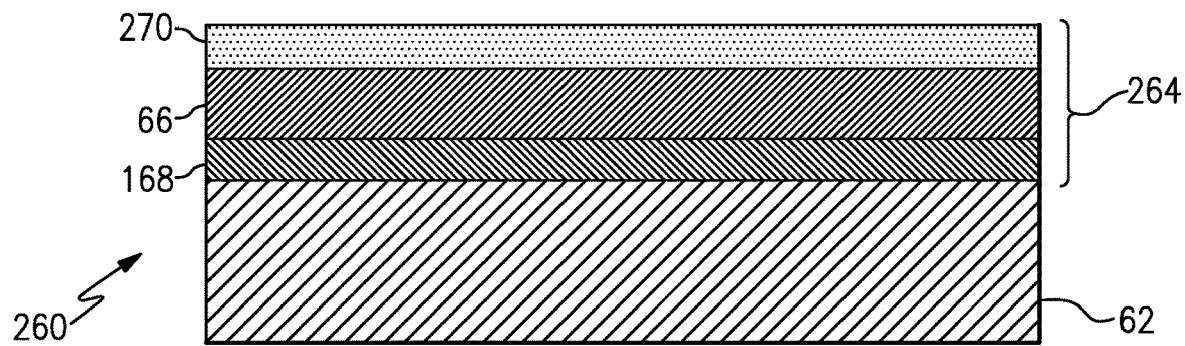
FIG. 4 illustrates a cross-section of a portion of an article that has a Mo—Si—B alloy substrate, a noble metal barrier layer, a metal interlayer, and a topcoat.

FIG. 4 illustrates another example article 260. In this example, the article 260 has a coating 264 which, in addition to the barrier layer 66 and the metal interlayer 168, includes a topcoat 270 that is disposed on the barrier layer 66. For example, the topcoat 270 may be formed of, but is not limited to, a silica material. In a further example, the topcoat includes the silica material and also molybdenum silicide ($Mo_3Si$).

The topcoat 270 may serve as an additional oxygen barrier layer and/or to protect the barrier layer 66. The topcoat 270 and barrier layer 66 may also function cooperatively for stress management. For instance, the topcoat 270 may be brittle in comparison to the barrier layer 66. But for the barrier layer 66, any cracking in the topcoat 270 could propagate into the substrate 62. However, the barrier layer 66 is ductile in comparison to the topcoat 270 and can potentially arrest cracks that propagate from the topcoat 270. Thus, the barrier layer 66 may also serve to enhance durability.

Figure 5:
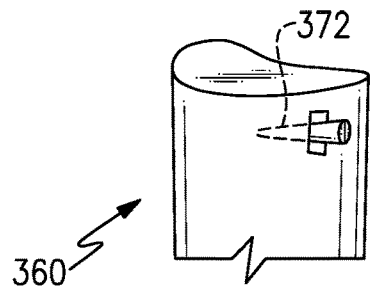
FIG. 5 illustrates an article with a substrate that has an internal cavity.
Figure 6:
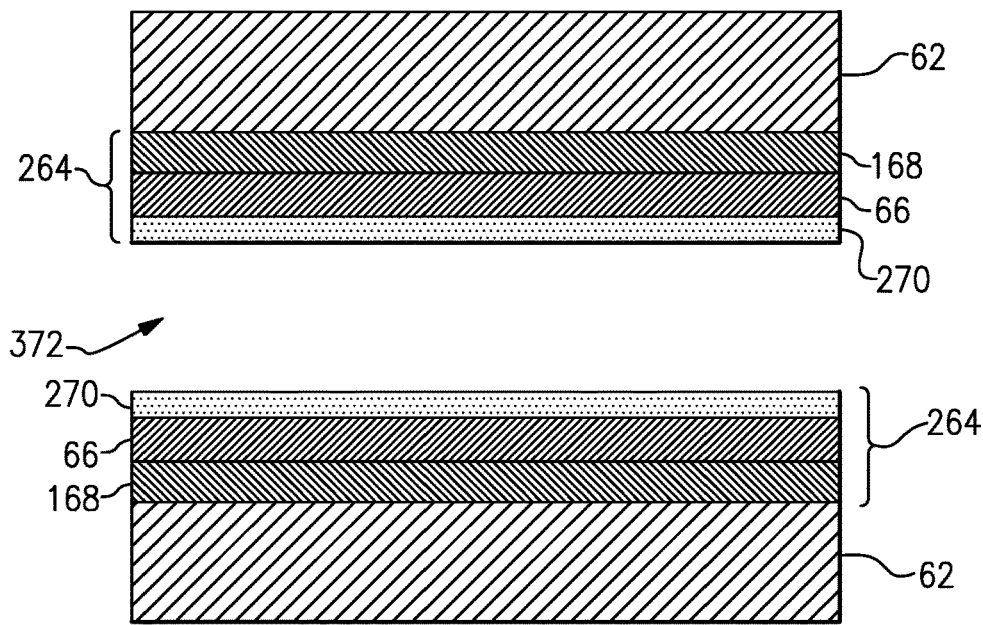
FIG. 6 illustrates a cross-section of a portion of the article of FIG. 5, with a noble metal barrier layer disposed in the internal cavity.

FIG. 5 illustrates a portion of another example article 360. The illustrated portion is an airfoil but alternatively may be a blade outer air seal or other type of component. The article 360 includes in internal cavity 372. In this example, the internal cavity 372 is an internal cooling passage that opens to the exterior surface of the article. FIG. 6 illustrates a representative portion of the internal cavity 372. In this example, the substrate 62 defines the internal cavity 372, and the barrier layer 66, metal interlayer 168, and topcoat 270 are disposed on the substrate 62 in the internal cavity 372.

The article 60/160/260/360 can be fabricated by depositing the barrier layer 66 onto the substrate 62. For instance, the noble metal is deposited onto the substrate 62 using an electroplating process. If used, the metal interlayer 168 is deposited onto the substrate 62 prior to deposition of the barrier layer 66. The metal interlayer 168 can also be deposited using an electroplating process. Other deposition techniques may alternatively be used, such as but not limited to, physical vapor deposition, chemical vapor deposition, and plasma spray. However, such processes are typically line-of-sight. To deposit on the internal cavity 372 or to completely coat all surfaces of the substrate 62, the electroplating process may be used.

If the metal interlayer 168 is used, the substrate 62 with the deposited metal interlayer 168 and the deposited barrier layer 66 may be thermally treated. For example, the thermal treatment may be conducted under vacuum at a temperature that is above the melting point of the metal of the metal interlayer 168 but below the melting point of the noble metal of the barrier layer 66. The heat treatment melts the metal of the metal interlayer 168 and "brazes" the barrier layer 66 to the substrate 62. The heat treatment may also serve to densify or consolidate the metal interlayer 168, the barrier layer 66, or both, which may further enhance barrier properties to oxygen infiltration.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. An article comprising:
   a substrate formed of a molybdenum-based alloy;
   a barrier layer immediately adjacent to and contiguous with the substrate, the barrier layer formed of at least one noble metal, and
   a topcoat disposed on the barrier layer, wherein the topcoat includes a silica material and molybdenum silicide.

2. The article as recited in claim 1, wherein the at least one noble metal is selected from the group consisting of ruthenium, rhodium, palladium, silver, osmium, iridium, platinum, gold, and combinations thereof.

3. The article as recited in claim 1, wherein the at least one noble metal includes platinum.

4. The article as recited in claim 1, wherein the substrate defines an internal cavity, and the barrier layer is disposed on the substrate in the internal cavity.

5. The article as recited in claim 1, wherein the barrier layer has a thickness of between 1 micrometer and about 50 micrometers.

6. The article as recited in claim 1, wherein the molybdenum-based alloy includes at least 0.2% by weight of alloying elements, and the balance molybdenum.

7. The article as recited in claim 6, wherein the alloying elements include silicon and boron.

8. A method of fabricating an article, the method comprising:

depositing a barrier layer onto a substrate formed of a molybdenum-based alloy, the barrier layer having at least one noble metal; and depositing a topcoat on the barrier layer, wherein the topcoat includes a silica material and molybdenum silicide.

9. The method as recited in claim 8, wherein the depositing is by electroplating.

10. The method as recited in claim 8, wherein the substrate defines an internal cavity, and the barrier layer is deposited on the substrate in the internal cavity.

11. The method as recited in claim 8, wherein the barrier layer has a thickness of between 1 micrometer and about 50 micrometers after the depositing.

12. The method as recited in claim 8, wherein the molybdenum-based alloy includes at least 0.2% by weight of alloying elements, and the balance molybdenum.

13. The method as recited in claim 12, wherein the alloying elements include silicon and boron.

14. A gas turbine engine section comprising:

an engine section selected from the group consisting of a compressor section, a combustor section, and a turbine section, the engine section having a turbine engine component including, a substrate formed of a molybdenum-based alloy, a barrier layer disposed on the substrate, the barrier layer formed of at least one noble metal, and a topcoat disposed on the barrier layer, wherein the topcoat includes a silica material and molybdenum silicide.

15. The gas turbine engine section as recited in claim 14, wherein the at least one noble metal is selected from the group consisting of ruthenium, rhodium, palladium, silver, osmium, iridium, platinum, gold, and combinations thereof.

16. The gas turbine engine section as recited in claim 14, wherein the substrate defines an internal cavity, and the metal interlayer and the barrier layer are disposed on the substrate in the internal cavity.

17. The gas turbine engine section as recited in claim 14, wherein the barrier layer has a thickness of between 1 micrometer and about 50 micrometers after the depositing.

18. The gas turbine engine section as recited in claim 14, wherein the molybdenum-based alloy includes at least 0.2% by weight of alloying elements, and the balance molybdenum.

\* \* \* \* \*